United States Patent
Sale et al.

(10) Patent No.: US 10,128,527 B2
(45) Date of Patent: Nov. 13, 2018

(54) LAMINATING APPARATUS

(71) Applicant: Manz Italy S.R.L., Sasso Marconi (Bologna) (IT)

(72) Inventors: Massimiliano Sale, Sasso Marconi (IT); Marco Vivarelli, Casalecchio di Reno (IT)

(73) Assignee: Manz Italy S.R.L., Sasso Marconi (Bologna) (IT)

( * ) Notice: Subject to any disclaimer, the term of this patent is extended or adjusted under 35 U.S.C. 154(b) by 148 days.

(21) Appl. No.: 15/034,539

(22) PCT Filed: Nov. 10, 2014

(86) PCT No.: PCT/IB2014/065920
§ 371 (c)(1),
(2) Date: May 4, 2016

(87) PCT Pub. No.: WO2015/068140
PCT Pub. Date: May 14, 2015

(65) Prior Publication Data
US 2016/0276701 A1    Sep. 22, 2016

(30) Foreign Application Priority Data
Nov. 11, 2013  (IT) .............................. MO2013A0309

(51) Int. Cl.
*B32B 37/00* (2006.01)
*H01M 10/04* (2006.01)
(Continued)

(52) U.S. Cl.
CPC ...... *H01M 10/0436* (2013.01); *H01G 9/0029* (2013.01); *H01M 6/005* (2013.01);
(Continued)

(58) Field of Classification Search
CPC . B32B 37/0053; B32B 37/10; B32B 37/1054; B65H 2511/224; B65H 2404/1441; B21B 37/60
(Continued)

(56) References Cited

U.S. PATENT DOCUMENTS 3,490,256 A      1/1970   O'Brien
7,128,795 B2 *  10/2006   Byrne ................ B65H 19/1836
                                                    156/159
(Continued)

FOREIGN PATENT DOCUMENTS

AU      78408 81        6/1983
JP      2009-328174    12/1997
(Continued)

OTHER PUBLICATIONS

International Search Report for International Application PCT/IB2014/065920, dated Apr. 13, 2015.

*Primary Examiner* — Carson Gross
(74) *Attorney, Agent, or Firm* — Morse, Barnes-Brown & Pendleton, P.C.; Sean D. Detweiler, Esq.

(57) ABSTRACT

There is described a laminating apparatus for coupling electrodes of non-rectangular shape with a separating film for the manufacture of electric energy accumulating devices, wherein a pair of laminating rollers has a roller driven by an elastic arrangement loaded with a variable force adjusted by an endless screw conveyor controlled by a brushless motor, during the passage of the electrodes, so as to vary the laminating force according to the width of the electrode laminated instant by instant, in order for the laminating pressure to remain almost constant.

14 Claims, 5 Drawing Sheets

(51) Int. Cl.
*H01G 9/00* (2006.01)
*H01M 6/00* (2006.01)
*H01M 6/02* (2006.01)
*B21B 37/60* (2006.01)
*B32B 37/10* (2006.01)

(52) U.S. Cl.
CPC ......... *H01M 6/02* (2013.01); *H01M 10/0404* (2013.01); *B21B 37/60* (2013.01); *B32B 37/0053* (2013.01); *B32B 37/10* (2013.01); *B32B 37/1054* (2013.01); *B65H 2404/1441* (2013.01); *B65H 2511/224* (2013.01); *H01M 10/0413* (2013.01)

(58) Field of Classification Search
USPC ......... 156/64, 350, 358, 360, 361, 362, 367, 156/378, 379
See application file for complete search history.

(56) References Cited

U.S. PATENT DOCUMENTS

| | | | |
|---|---|---|---|
| 2002/0062903 A1* | 5/2002 | Couillard | B29C 65/087 156/73.1 |
| 2011/0049800 A1* | 3/2011 | deJong | B65H 5/062 271/273 |
| 2012/0246917 A1 | 10/2012 | Dairen et al. | |

FOREIGN PATENT DOCUMENTS

| | | |
|---|---|---|
| JP | H11 339775 | 12/1999 |
| JP | 2000-357507 | 12/2000 |
| JP | 2013-518633 | 5/2013 |

* cited by examiner

LAMINATING APPARATUS

RELATED APPLICATIONS

This application is a national stage filing under 35 U.S.C. 371 of International Application No. PCT/IB2014/065920, filed Nov. 10, 2014, which claims priority to Italian Application No. MO2013A000309, filed Nov. 11, 2013. The entire teachings of International Application No. PCT/IB2014/065920, filed Nov. 10, 2014, are incorporated herein by reference. International Application PCT/IB2014/065920 was published under PCT Article 21(2) in English.

BACKGROUND OF THE INVENTION

This invention relates to a laminating apparatus, in particular to an apparatus for coupling electrodes with a separating film by way of lamination.

Specifically, but not exclusively, this apparatus may be used to manufacture electric energy accumulating devices.

In particular, reference is made to a roll laminating apparatus that may be advantageously used to laminate flat objects of non-rectangular shape.

A problem with the roll lamination of objects of non-rectangular shape is to ensure a laminating pressure that is constant all over the surface of the object to be laminated. Indeed, when an object of non-rectangular shape passes between two laminating rollers, the width of the object subjected—instant by instant—to the laminating force applied by the rollers varies depending on the shape of the object.

If the laminating pressure (always equal to the ratio between the laminating force applied by the rollers and the surface subjected to such force) is not constant, there is the risk to make a product that has been subjected—in some areas—to an insufficient laminating pressure, such that it may be incorrectly assembled, and/or has been subjected—in other areas—to an excessive laminating pressure, with consequent possible damage to the product, in particular to the separating film, whereby the latter may lose—at least in part—the features that are necessary to manufacture a good-quality electric energy accumulating device.

SUMMARY OF THE INVENTION

An object of the invention is to provide a laminating apparatus capable of solving the aforesaid prior art problem.

An advantage is to provide a laminating apparatus of the type comprising rollers, capable of laminating flat-shaped objects with a laminating pressure which is practically constant all over the surface of the objects.

An advantage is to achieve high-quality lamination for flat objects of non-rectangular shape.

An advantage is to provide a laminating apparatus suitable for laminating flat, non-rectangular electrodes with a continuous separating film, in particular for the manufacture of electric energy accumulating devices.

An advantage is to achieve an assembly with a stable, strong coupling between electrodes and separating film, without damaging the separating film.

An advantage is to provide an apparatus that is structurally simple and inexpensive, featuring high productivity and excellent reliability.

These and other objects and advantages are achieved by the apparatus according to one or more of the claims reported below.

In an example, a laminating apparatus has a pair of laminating rollers, wherein one of the two rollers is thrust by an elastic arrangement loaded with a variable force so as to vary the laminating force applied by the rollers in a laminating zone comprised between the rollers, and wherein a programmable electronic processor controls a motor that adjusts the load of the elastic arrangement, such that when an object to be laminated passes between the rollers, the laminating force is varied depending on the width of the object that instant by instant passes through the laminating zone, in order for the laminating pressure to remain almost constant. The motor may drive the movement of a movable element (e.g., the translating element of an endless screw conveyor) interacting with the elastic arrangement with a load depending on the position of the element itself. The electronic processor may be equipped with both a data input unit for receiving information on the object to be laminated and a processing unit for associating the object to be laminated with a preset law of motion of the movable element so as to vary the laminating force to be applied during the passage of the object. This preset law of motion may be selected among a plurality of laws of motion stored in an electronic memory connected to the processor. The apparatus may be equipped with a sensor arrangement arranged upstream of the laminating zone, along an supplying path of the object, for detecting the passage of the objects to be laminated, such that the movement of the movable element, and the related variation of the laminating force, be in phase with the passage of the objects through the laminating zone.

BRIEF DESCRIPTION OF THE DRAWINGS

The invention may be better understood and implemented with reference to the attached drawings, these showing non-limiting exemplary embodiments.

DETAILED DESCRIPTION

Figure 2:
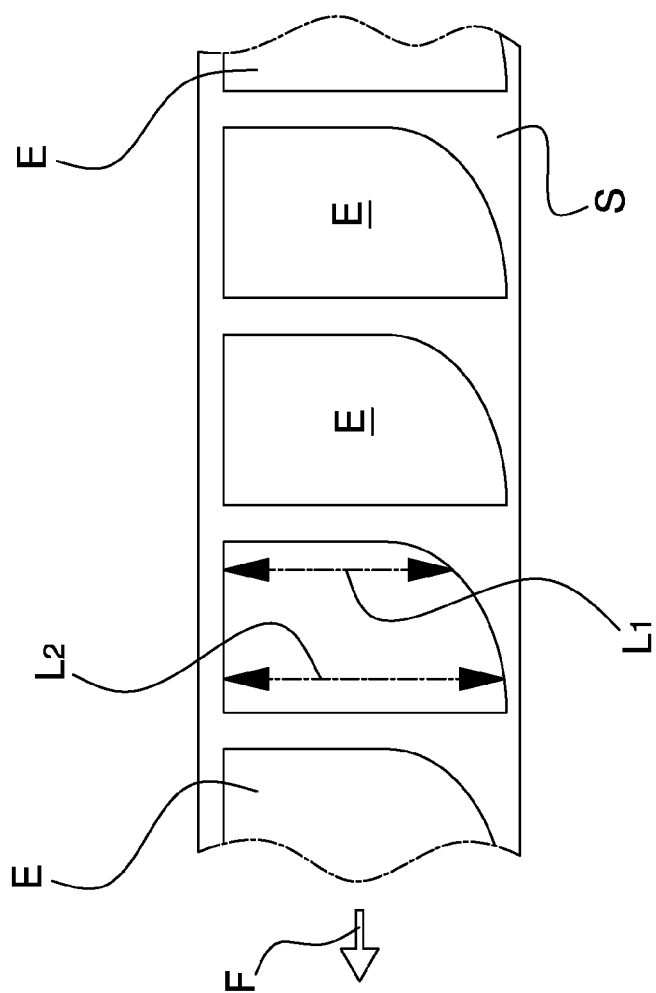
FIG. 2 shows a schematic plan view from above of a product that may be laminated with an apparatus provided according to the invention.
Figure 1:
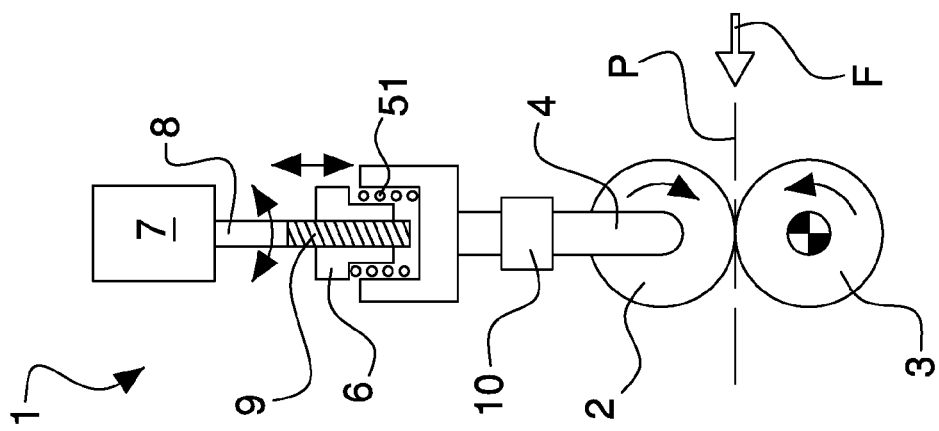
FIG. 1 shows a vertical elevation diagram of a first example of a laminating apparatus according to the present invention.
Figure 3:
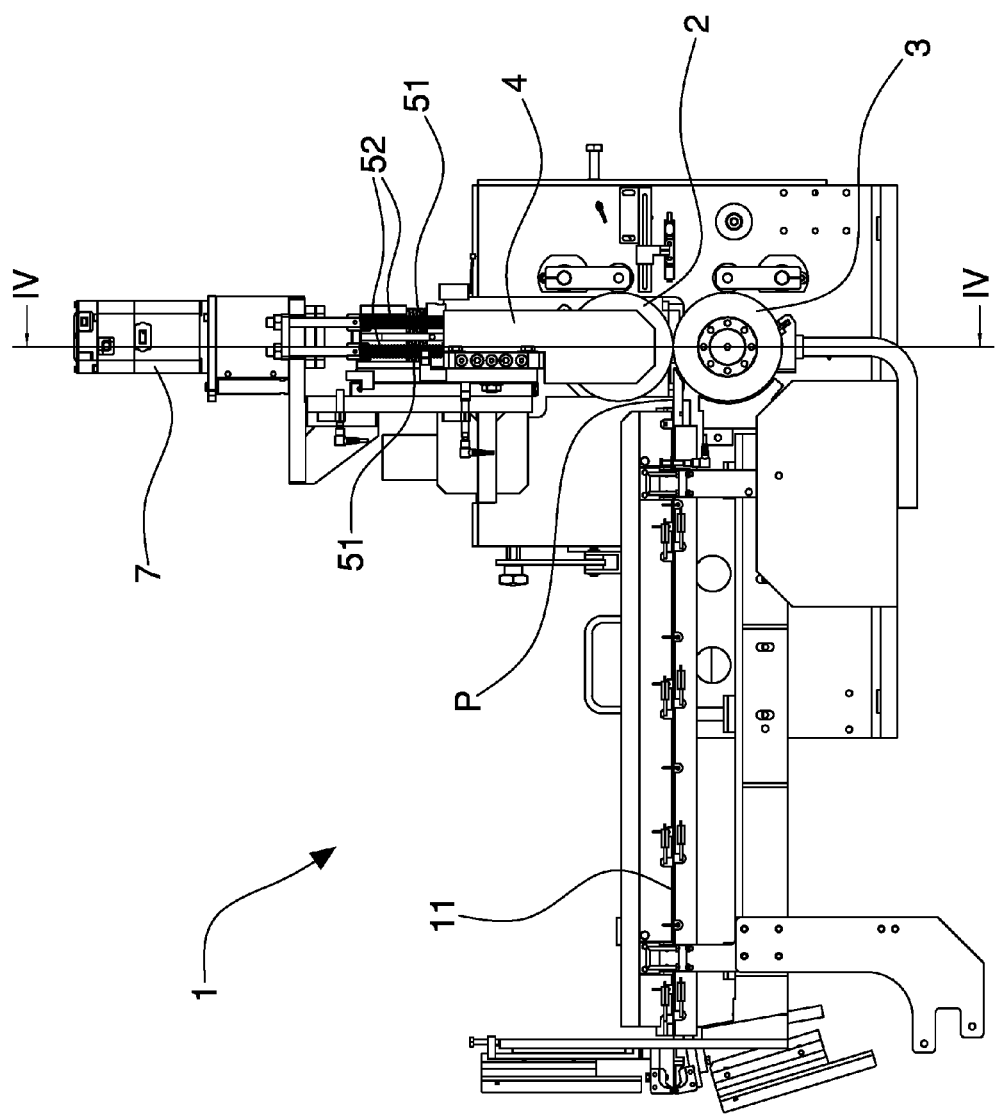
FIG. 3 shows a vertical elevation front view of a second example of a laminating apparatus according to the present invention.
Figure 4:
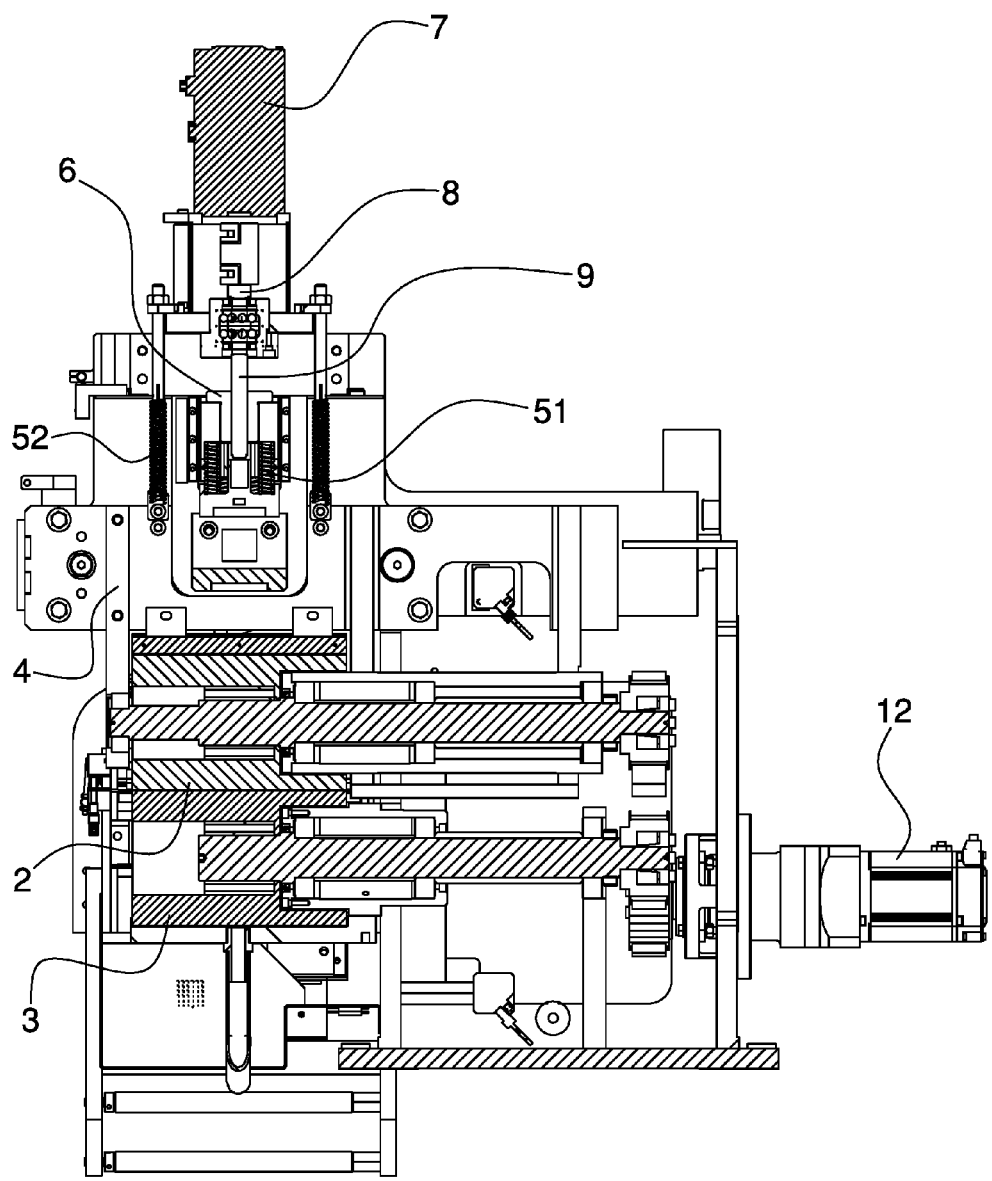
FIG. 4 shows section IV-IV of FIG. 3.
Figure 5:
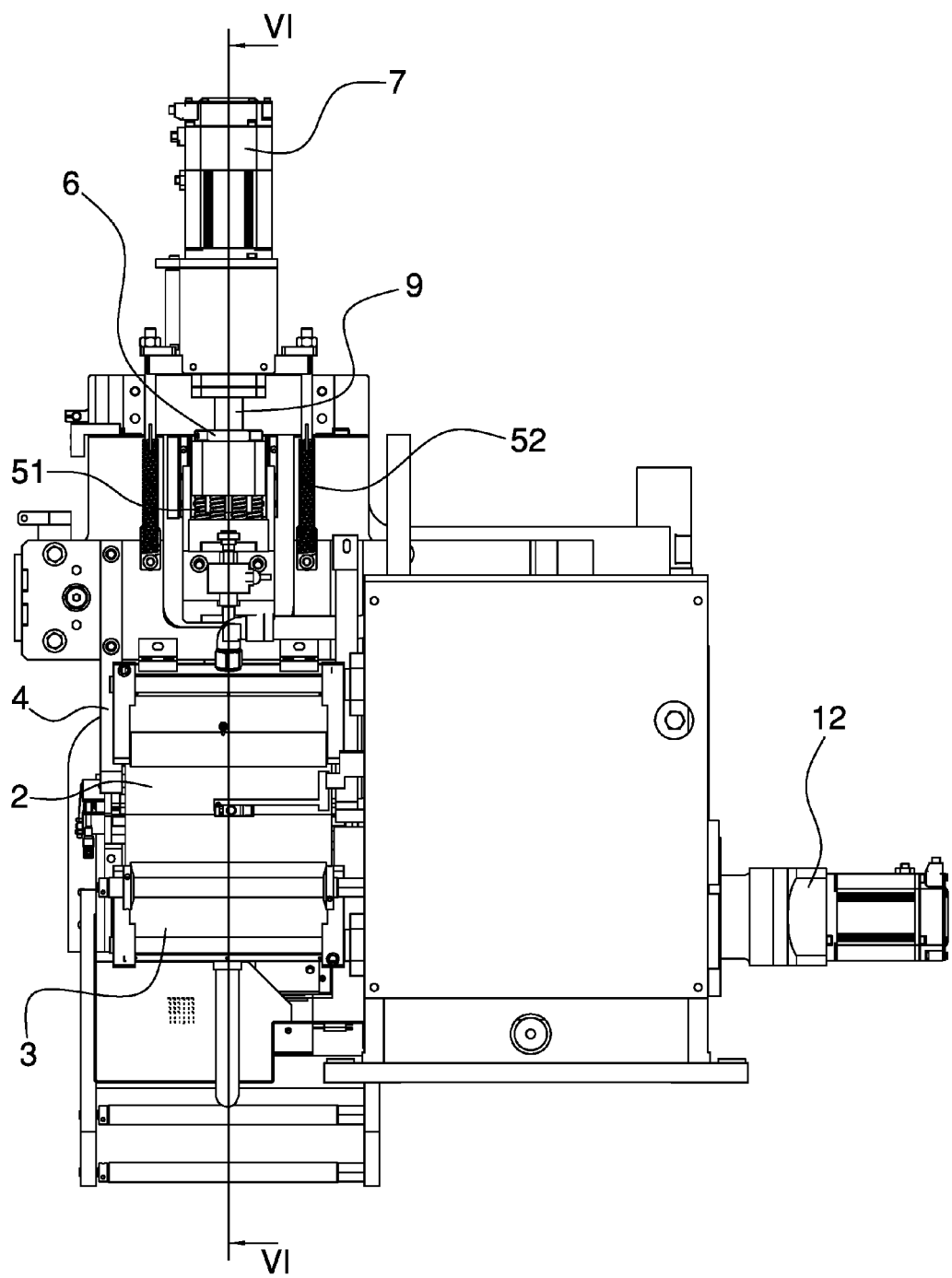
FIG. 5 shows a right-side view of FIG. 3.
Figure 6:
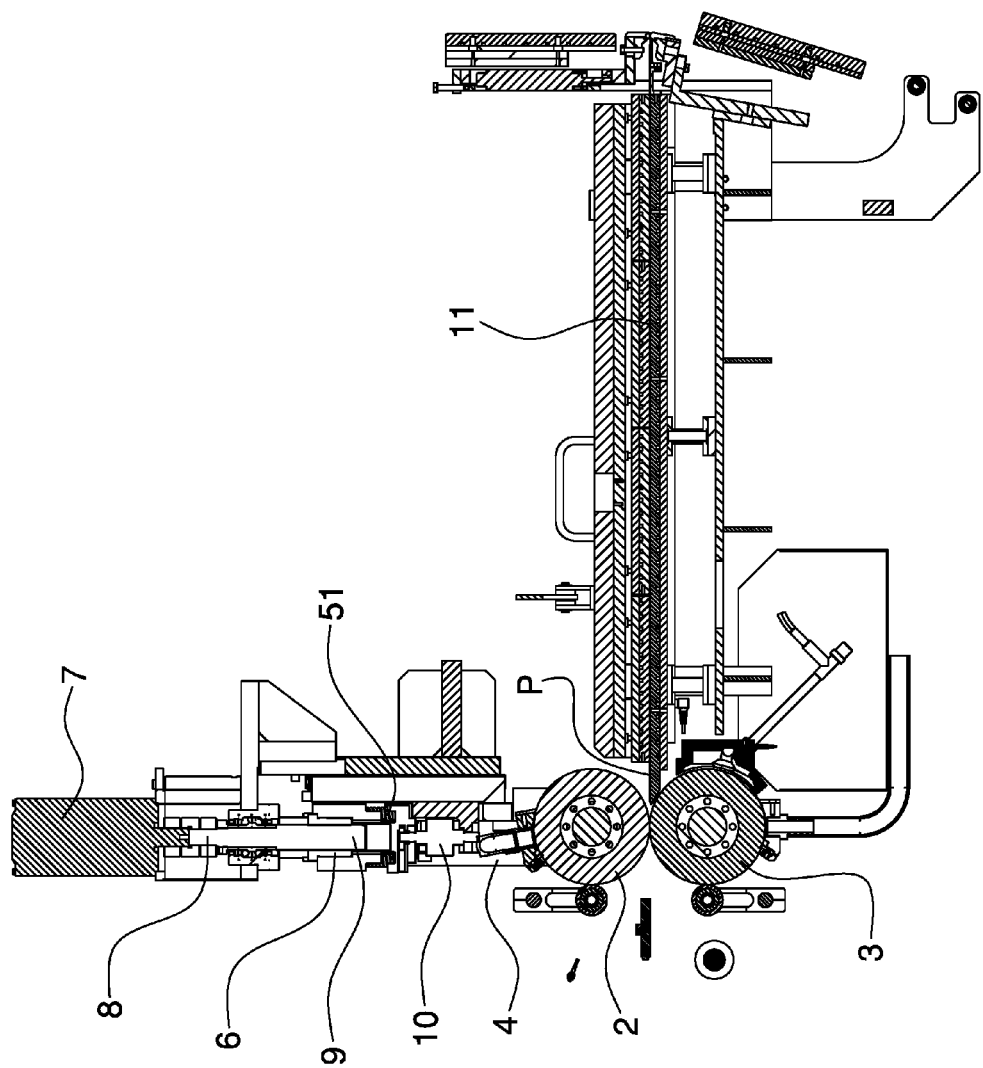
FIG. 6 shows section VI-VI of FIG. 5.

Referring to the aforesaid FIGS. 1-6, by the numeral 1 there is indicated as a whole a laminating apparatus that may be used in particular for manufacturing electric energy accumulating devices (batteries, capacitors, etc.). In particular, the laminating apparatus 1 may be used to couple at least one flat electrode E of non-rectangular shape with at least one separating film S. For the sake of clearer illustration, in the figures the same reference numerals are used to designate like elements of the several exemplary embodiments.

The apparatus 1 comprises a first (upper) laminating roller 2 and a second (lower) laminating roller 3 that are coupled together and opposite each other to define a laminating zone extending between the rollers. In particular, the two laminating rollers 2 and 3 have rotational axes that are parallel to each other (horizontal). The laminating zone may extend in width in a direction parallel to the axes of the two laminating rollers 2 and 3.

Through the laminating zone extending between the rollers 2 and 3 there passes an object to be laminated (e.g., one or more electrodes E arranged one after the other, in a row, to be assembled with at least one continuous separating film S), this being supplied in an advancement direction F that is transverse to the width of the laminating zone. In particular, the advancement direction F may be perpendicular to the plane containing the axes (parallel to one another) of the laminating rollers 2 and 3.

The first (upper) roller 2 may be rotatably mounted on a support 4 connected by a (first) elastic arrangement 51 (or regulating elastic arrangement 51) to a movable element 6, the movement of which causes variation in the load of the first elastic arrangement 51 and the consequent variation in the laminating force exerted by the rollers 2 and 3 on the object in the laminating zone.

The load of the first laminating roller 2 may rest, at least in part, on an additional or second elastic arrangement 52 (or roller supporting elastic arrangement 52). The second elastic arrangement 52 may be designed to balance and/or support at least one part, comprised between 50% and 100%, of the weight of the first roller 2.

The apparatus 1 may comprise a motor 7 that drives the (vertical) movement of the movable element 6. The motor 7 may comprise a brushless motor, for example.

As in the examples illustrated herein, the movable element 6 may comprise a translating part of a mechanism for transforming a rotary motion of a rotary shaft 8 of the motor 7 into a translation movement of the aforesaid translating part of the mechanism. For example, this mechanism may comprise a screw-nut screw mechanism, in particular a ball bearing screw 9.

The apparatus 1 may comprise a programmable electronic motor control arrangement. These control arrangement may comprise, for example, a control unit (CPU), not shown, and computer program instructions executable by the control arrangement. In particular, the control arrangement may comprise an arrangement for moving the movable element 6 whilst the product to be laminated traverses the laminating zone, making the movable element 6 follow a preset law of motion so as to vary the laminating force according to the width of the product that instant by instant is in the laminating zone, in order for the laminating pressure to remain almost constant. FIG. 2 shows an example of an object to be laminated. This object comprises the continuous separating film S upon which a plurality of electrodes E is arranged one after the other, in a row. The object is supplied for lamination according to the advancement direction F. These electrodes E may have a non-rectangular shape, such that the width of the electrodes E (i.e., their dimension in a direction transverse to the advancement direction and/or in a direction parallel to the width of the laminating zone) is not constant: a single electrode E may have a laminating zone having a width $L_1$ and another laminating zone having a width $L_2 \neq L_1$. In this specific case ($L_2 > L_1$), in order to achieve an almost constant laminating pressure, the laminating force $F_1$ applied on a portion of object with a width less than $L_1$ shall be less than the laminating force $F_2$ applied on a portion with a width greater than $L_2$, e.g., proportionally such that $F_1/L_1 = F_2/L_2$.

The control arrangement may comprise an arrangement for receiving information on the object to be laminated, for example information relating to the shape and/or size and/or type of object, and an arrangement for setting a desired law of motion of the element 6 on the basis of the information received. In particular, these control arrangement may comprise an arrangement for storing two or more laws of motion for the movable element 6 and an arrangement for associating one of the aforementioned stored laws of motion with the aforesaid information relating to the object to be laminated.

The apparatus 1 may comprise a sensor arrangement 10 for measuring the laminating force applied by the first laminating roller 2, and an arrangement for characterising the first elastic arrangement 51 by determining the course of the laminating force according to the position of the movable element 6. The control arrangement may comprise an arrangement for receiving a desired law of variation of the laminating force (for example a law of variation calculated on the basis of the shape of the objects to be laminated, in order to obtain a desired laminating pressure that is almost constant all over the surface of the objects), and a processing arrangement that uses the characterisation of the first elastic arrangement 51, and determines—by so doing—a desired law of motion of the movable element 6 which causes the desired law of variation of the laminating force.

For example, the force sensor arrangement may comprise at least a load cell or another force transducer.

The apparatus 1 may comprise a first supplying arrangement for supplying flat objects (of non-rectangular shape), for example electrodes E, one by one to the laminating zone, and a second supplying arrangement for supplying a continuous film S, for example a separating film, to the laminating zone in cooperation with the first supplying arrangement, such that the flat objects are coupled with the continuous film in the laminating zone. The first supplying arrangement may be arranged so as to deposit the flat objects one after the other, in a row, on the continuous film. In FIGS. 3-6, the first and second supplying arrangement (which may comprise a supplying arrangement of a known type and thus not described in greater detail) are shown at least in part. In particular, by the numeral 11 there is indicated a (horizontal) transporting plane upon which there advances the product to be laminated. One may expect that the product to be laminated (separating film S and electrodes E) be preheated, for example in a known manner, prior to reaching the laminating zone.

The apparatus 1 may comprise a sensor arrangement (of a known type, for example) arranged upstream of the laminating zone, along a supplying path P of the object to be laminated, to detect the position of the object. These position or proximity sensor arrangement may comprise a contactless sensor arrangement (e.g., of the optic, ultrasonic, magnetic type, and so on) or of another type.

The control arrangement may comprise a for bringing the motor 7 that drives the movable element 6 into phase with the detected position of the object moving forward, such that the variation in the laminating force (which depends on the variation in the position of the movable element 6) be in phase with the passage of the object through the laminating zone, in order to obtain the desired laminating pressure.

In use, a laminating roller driving motor 12, for example a motor 12 applied to the second (lower) roller 3 and/or the first (upper) roller 2, provides for the rotation of the rollers whilst the product to be laminated (electrodes E on the film S) moves forward towards the laminating zone. In this particular case, both rollers 2, 3 are motor-driven. The control arrangement sets the desired law of motion of the movable element 6. For example, the law of motion may be either calculated on the basis of the state of the width L of the product (in particular the electrodes E) or selected from a group of laws by associating the type of product to the corresponding law.

The variation in the position of the movable element 6 will cause a variation in the load on the first elastic arrangement 51 and the consequent variation in the laminating force. The adjustment of the position of the movable element 6 begins when at least one end of the product (the front or forward end of the electrode E) enters the laminating zone. This phasing of the adjustment may be provided on the basis of the position signal emitted by the sensor arrangement detecting the position of the product, arranged upstream of the laminating zone.

The laminating zone comprises a line or a thin strip extended in width, parallel to the roller axis. At least one part of the product to be laminated (electrode E) has a varying width L (as it is non-rectangular in shape). When the product passes, the laminating force $F_L$ is varied, such that the laminating pressure (almost proportional to the ratio $F_L/L$) is kept constant.

The lamination results to be regular and uniform all over the surface of the laminated product. It is thus possible to obtain a constant laminating pressure suitable for reaching the desired, sufficiently strong and resistant coupling, in particular between the separating film S and the electrodes E, without causing any excessive stress on some parts of the laminated product, in particular on the (polymeric) material of the separator, since an excessive stress on the latter may result in either a loss of or a decrease in its features, e.g., the electric properties, useful to manufacture an efficient electric energy accumulating device.

The invention claimed is:

1. Laminating apparatus, comprising a first and a second laminating roller that are opposite each other to define a laminating zone extending in width and through which there passes a product subjected to a laminating force applied by the rollers and supplied in an advancement direction that is transverse to the width of the laminating zone, said first roller being rotatably mounted on a support connected to a movable element the movement of which causes a variation in the laminating force between said rollers, said apparatus comprising a motor that drives the movement of said movable element and a programmable electronic control unit configured to move said movable element whilst the product traverses the laminating zone so as to vary the laminating force depending on the width of the product instant by instant as the product passes through the laminating zone causing laminating pressure to remain constant.

2. Apparatus according to claim 1, wherein said support is connected to said movable element by an elastic arrangement, such that the movement of said movable element causes a variation in a load of said elastic arrangement and the consequent variation in the laminating force between said rollers.

3. Apparatus according to claim 1, wherein said control unit is configured to receive information on the product to be laminated relating to the shape and/or type of the product, and control a motion of said movable element on the basis of the information received.

4. Apparatus according to claim 3, wherein said control unit is configured to store two or more motions of said movable element and associate said received information with one of said two or more motions.

5. Apparatus according to claim 1, comprising a sensor for measuring the laminating force applied to said first roller, said control unit being configured to receive a desired variation of the laminating force and for determining a desired motion of said movable element which causes the desired variation of the laminating force.

6. Apparatus according to claim 5, wherein said sensor arrangement comprises at least one load cell or another force transducer.

7. Apparatus according to claim 1, wherein said movable element is integral with a translating part of a mechanism for transforming a rotary motion of a shaft of said motor into a translation movement of said translating part.

8. Apparatus according to claim 7, wherein said motion transforming mechanism comprises a screw-nut screw mechanism.

9. Apparatus according to claim 8, wherein said screw-nut screw mechanism comprises a ball bearing screw.

10. Apparatus according to claim 1, wherein said motor comprises a brushless motor.

11. Apparatus according to claim 1, comprising an additional elastic arrangement designed to support at least one part of the weight of said first roller.

12. Apparatus according to claim 1, comprising a sensor arrangement arranged upstream of said laminating zone, along a supplying path of the product to be laminated, to detect the position of the product itself, said control unit being configured to bring said motor into phase with the detected position of the product, such that the variation in the laminating force be in phase with the passage of the product through the laminating zone.

13. Apparatus according to claim 1, wherein said rollers have axes that are parallel to each other, and said movable element translates in a translation direction perpendicular to the roller axes.

14. Method for manufacturing an electric energy accumulating device, wherein a laminating apparatus according to claim 1 is used to couple at least one flat electrode with at least one separating film.

* * * * *